(12) United States Patent
Xue et al.

(10) Patent No.: US 12,542,745 B2
(45) Date of Patent: Feb. 3, 2026

(54) INFORMATION TRANSMISSION METHOD AND DEVICE, STORAGE MEDIUM, AND ELECTRONIC DEVICE

(71) Applicant: ZTE Corporation, Shenzhen (CN)

(72) Inventors: Yan Xue, Shenzhen (CN); Feng Xie, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 323 days.

(21) Appl. No.: 18/009,360

(22) PCT Filed: Apr. 22, 2021

(86) PCT No.: PCT/CN2021/088982
§ 371 (c)(1),
(2) Date: Dec. 9, 2022

(87) PCT Pub. No.: WO2022/001315
PCT Pub. Date: Jan. 6, 2022

(65) Prior Publication Data
US 2023/0300038 A1    Sep. 21, 2023

(30) Foreign Application Priority Data
Jun. 29, 2020 (CN) .......................... 202010606444.5

(51) Int. Cl.
*H04L 47/2408* (2022.01)
*H04L 41/5009* (2022.01)
*H04W 72/542* (2023.01)

(52) U.S. Cl.
CPC ...... *H04L 47/2408* (2013.01); *H04L 41/5009* (2013.01); *H04W 72/542* (2023.01)

(58) Field of Classification Search
CPC ............... H04W 72/542; H04W 28/24; H04W 28/0268; H04L 47/2408; H04L 47/70; H04L 47/24
See application file for complete search history.

(56) References Cited

U.S. PATENT DOCUMENTS

2019/0319840 A1    10/2019  Cheng
2020/0374742 A1*   11/2020  Chong ................ H04W 72/542

FOREIGN PATENT DOCUMENTS

| CN | 102340791 A | 2/2012 |
| CN | 103747522 A | 4/2014 |

(Continued)

OTHER PUBLICATIONS

1 European Search Report for corresponding application EP21833144; Report dated Dec. 7, 2023.

(Continued)

*Primary Examiner* — Kyung H Shin
(74) *Attorney, Agent, or Firm* — CANTOR COLBURN LLP

(57) ABSTRACT

Embodiments of the present disclosure provide an information transfer method and apparatus, a storage medium, and an electronic apparatus. The method includes: a first network element acquires information of a first acquisition position and information of content to be acquired on the first acquisition position (S101); and the first network element performs information acquisition according to the information of a first acquisition position and the information of content to be acquired on the first acquisition position (S102). By means of the present disclosure, the problems in the related art that information that is able to be perceived by a communication system is limited, the implementation manner in an information transfer process is relatively complex and it is difficult to ensure the quality of service, is able to be solved, thereby achieving the following effects:

(Continued)

the range of information that is able to be perceived by a communication system is increased, the capability of the communication system perceiving information is enhanced, the implementation manner in an information transfer process is simple, the guarantee degree of quality of service is high, and it is applicable to various network architectures.

19 Claims, 5 Drawing Sheets

(56) References Cited

FOREIGN PATENT DOCUMENTS

| | | | |
|---|---|---|---|
| CN | 108319234 A | 7/2018 | |
| CN | 109600790 A | 4/2019 | |
| CN | 109788030 A | 5/2019 | |
| CN | 110166377 A * | 8/2019 | ......... H04L 47/2408 |
| CN | 111213412 A | 5/2020 | |
| CN | 111885549 A | 11/2020 | |
| EP | 3090594 B1 | 11/2017 | |
| WO | 2017142453 A1 | 8/2017 | |
| WO | 2019029353 A1 | 2/2019 | |
| WO | 2020088350 A1 | 5/2020 | |

OTHER PUBLICATIONS

International Search Report for corresponding PCT/CN2021/088982 filed Apr. 22, 2021; Report dated Jul. 14, 2021.
Chinese Search Report for Application No. 2020106064445, dated Sep. 4, 2024, 6 pages with translation.
Chinese Office Action for corresponding application 202010606444. 5: mail date Aug. 21, 2025.

* cited by examiner

INFORMATION TRANSMISSION METHOD AND DEVICE, STORAGE MEDIUM, AND ELECTRONIC DEVICE

CROSS-REFERENCE TO RELATED APPLICATION

The present disclosure is a National Stage Filing of the PCT International Application No. PCT/CN2021/088982 filed on Apr. 22, 2021, which claims priority to Chinese Patent Application No. 202010606444.5, filed to the China National Intellectual Property Administration on Jun. 29, 2020, the disclosure of which is hereby incorporated by reference in its entirety.

TECHNICAL FIELD

Embodiments of the present disclosure relate to the field of network communications, and in particular, to an information transfer method and apparatus, a storage medium, and an electronic apparatus.

BACKGROUND

In current competitive communication and Internet environments, perceiving network changes, improving service perception capabilities, and constructing, maintaining and optimizing networks in a targeted manner are key factors for improving the competitiveness of operators and equipment manufacturers. Currently, network perception in the industry is often realized by performing measurement and detection etc. on an existing architecture system, and the limitations thereof are very large.

For perception of information in outside environment and various internal layers of a wireless network, information is acquired at different positions, and also needs to be transferred to different information nodes for different data processing. The current communication network protocol also divides a protocol stack into layers with reference to an Open System Interconnect (OSI) 7-layer protocol model, and the various layers are independent of one another and transparent to one another and are separately optimized, and communication is able to be only performed between adjacent layers in a fixed manner. In addition to certain limitations of the range and capability of information perception, the existing information perception means also has the disadvantages such as long information interaction time, being unable to flexibly adapt to information characteristics, redundancy easily occurring due to massive and messy perceived information, complex information transfer processing manner, and difficulty in ensuring the transfer of perceived information in terms of quality of service and delay requirements.

SUMMARY

Embodiments of the present disclosure provide an information transfer method and apparatus, a storage medium, and an electronic apparatus, so as to at least solve the problems in the related art that information that is able to be perceived by a communication system is limited, the implementation manner in an information transfer process is relatively complex and it is difficult to ensure the quality of service.

According to some embodiments of the present disclosure, an information transfer method is provided, including: a first network element acquires information of a first acquisition position and information of content to be acquired on the first acquisition position; and the first network element performs information acquisition according to the information of a first acquisition position and the information of content to be acquired on the first acquisition position.

In some exemplary embodiments, the method further includes: the first network element acquires first information acquisition indication information, wherein the first information acquisition indication information at least includes one of: the information of a first acquisition position of the first network element, the information of content to be acquired on the first acquisition position of the first network element, first acquisition mode indication information, a service identifier of the first network element, a service identifier of a third network element, a multi-network element shared service identifier, information acquisition indication information corresponding to the third network element, and an acquisition request from the third network element.

In some exemplary embodiments, the step that the first network element performs information acquisition according to the acquired information of a first acquisition position and the content information to be acquired on the first acquisition position comprises: the first network element performs information acquisition according to the information of a first acquisition position, the information of content to be acquired on the first acquisition position, and the first acquisition mode indication information in the first information acquisition indication information.

In some exemplary embodiments, the method further includes: the first network element determines a second network element and sends second information acquisition indication information to the second network element.

In some exemplary embodiments, the method further includes: the first network element acquires the first information acquisition indication information from a third network element.

In some exemplary embodiments, the method further includes: the first network element generates the first information acquisition indication information.

In some exemplary embodiments, the first network element determines second information acquisition indication information sent to a second network element according to one of: the first information acquisition indication information, the information of a first acquisition position of the first network element, the information of content to be acquired on the first acquisition position, information of a second acquisition position of the second network element, information of content to be acquired on the second acquisition position, request information of an internal logic unit of the first network element, a service identifier of the first network element, a service identifier of the third network element, a multi-network element shared service identifier, and an information acquisition mapping table acquired by the first network element.

In some exemplary embodiments, the second information acquisition indication information at least includes one of: the information of a second acquisition position of the second network element, the information of content to be acquired on the second acquisition position by the second network element, second acquisition mode indication information, a service identifier of the first network element, a service identifier of the third network element, a multi-network element shared service identifier, and an acquisition request from the first network element.

In some exemplary embodiments, after the first network element sends the second information acquisition indication information to the second network element, the method further includes: the first network element receives an acquisition response reported by the second network element, wherein the acquisition response includes one of: acquisition content information, an acquisition success message of the second network element, an acquisition failure message of the second network element, and an acquisition delay message of the second network element which are acquired by the second network element performing information acquisition according to the second information acquisition indication information.

In some exemplary embodiments, after the first network element acquires the acquisition content information reported by the second network element, the method further includes: the first network element performs information acquisition processing according to the acquisition content information reported by the second network element and the first information acquisition indication information acquired by the first network element.

In some exemplary embodiments, the information of a second acquisition position and the information of content to be acquired on the second acquisition position are jointly transmitted in an identifier manner or are respectively transmitted to the second network element.

In some exemplary embodiments, the first acquisition mode indication information and/or the second acquisition mode indication information at least include one of the following parameters: acquisition precision, acquisition content priority, acquisition content reliability, acquisition delay requirement, QoS of acquisition content, life cycle of the acquisition content, and service intention.

In some exemplary embodiments, the first acquisition mode indication information and/or the second acquisition mode indication information at least include one of the following parameters: an acquisition position, an acquisition object, an acquisition type, an acquisition cycle, an acquisition mode and an acquisition content transmission mode.

In some exemplary embodiments, the acquisition mode at least includes one of: centralized acquisition, decentralized acquisition, pass-through acquisition, direct acquisition and indirect acquisition.

In some exemplary embodiments, the first acquisition mode indication information and/or the second acquisition mode indication information further include information processing parameters, and the information processing parameters at least include one of: a data processing mode, a data encryption mode, a data compression mode, and a data statistics mode.

In some exemplary embodiments, the data processing mode at least includes one of: data averaging, data weighting, data filtering, and data removing.

In some exemplary embodiments, the data encryption mode at least includes one of: data encryption, data non-encryption, and adopted key.

In some exemplary embodiments, the data compression mode at least includes one of: data compression, data non-compression, and compression mode.

In some exemplary embodiments, the first network element determines the service identifier used thereby according to at least one of: the information of a first acquisition position acquired by the first network element, the information of content to be acquired on the first acquisition position, first acquisition mode indication information acquired by the first network element, and a service identifier acquired from a third network element.

In some exemplary embodiments, the first network element acquires the first acquisition mode indication information according to at least one of: the information of a first acquisition position acquired by the first network element, the information of content to be acquired on the first acquisition position, the service identifier acquired from the third network element, and the first information acquisition indication information.

In some exemplary embodiments, the service identifier of the first network element or the service identifier of the third network element indicates a perception service that is able to be provided, the service identifier including at least one of: service capability, service requirement, service object, service condition, service policy, report content, and service intent.

In some exemplary embodiments, the first network element or the second network element or a third network element includes at least one of: a general logic unit, a general entity, a general node, a dedicated logic unit, a dedicated entity, and a dedicated node.

In some exemplary embodiments, the first network element determines a second network element according to one of: the information of a first acquisition position of the first network element, the information of content to be acquired on the first acquisition position, information of a second acquisition position of the second network element, information of content to be acquired on the second acquisition position, request information of an internal logic unit of the first network element, a service identifier of the first network element, a service identifier received by the first network element from a third network element, a multi-network element shared service identifier, first information acquisition indication information, the second information acquisition indication information received from the third network element, and an information acquisition mapping table acquired by the first network element.

In some exemplary embodiments, the second network element determines the second acquisition mode indication information of the second network element according to at least one piece of the following information: the information of a second acquisition position of the second network element, the information of content to be acquired on the second acquisition position, the service identifier of the first network element acquired by the second network element, a service identifier of the second network element, a multi-network element shared service identifier acquired by the second network element, the second information acquisition indication information acquired by the second network element, and an information acquisition mapping table acquired by the second network element.

In some exemplary embodiments, the information of a first acquisition position acquired by the first network element at least includes one of: position information of the first network element, position information of a second network element, and position information of the content to be acquired by the first network element.

In some exemplary embodiments, the information of content to be acquired on the first acquisition position or the information of content to be acquired on a second acquisition position includes at least one of: signal quality, context, system configuration, network state, network performance, environment information, resource occupation situation, resource mapping situation, application information, and semantic information.

In some exemplary embodiments, the first network element acquires one of the following according to an information acquisition mapping table of the first network element: the information of a first acquisition position of the first network element, the information of content to be acquired on the first acquisition position, first acquisition indication information of the first network element, an identifier of the second network element, information of a second acquisition position of the second network element, information of content to be acquired on the second acquisition position, and second acquisition indication information of the second network element.

In some exemplary embodiments, an information acquisition mapping table acquired by the first network element includes one of: a static information acquisition mapping table which is stored by the first network element and contains a mapping relationship of acquisition information of multiple network elements, and a dynamic information acquisition mapping table which is calculated by the first network element and contains a mapping relationship of acquisition information of multiple network elements.

In some exemplary embodiments, the information of a first acquisition position or the information of a second acquisition position at least includes one of: a combined identifier of multiple object IDs, a node identifier, a user identifier, a network identifier, a combination of the cell identifier and the user identifier, a beam identifier, a protocol layer identifier, a domain name identifier and a resource identifier.

In some exemplary embodiments, the information of a first acquisition position and/or the information of a second acquisition position at least includes one of: a geographic position of the content information to be acquired, a logical position of the content information to be acquired, a time domain position of the content information to be acquired, a frequency domain position of the content information to be acquired, a space domain position of the content information to be acquired, a code domain position of the content information to be acquired, and a network identifier of the content information to be acquired.

According to other embodiments of the present disclosure, an information transfer apparatus is provided, the information transfer apparatus being located in a first network element and including: an acquisition unit, configured to acquire information of a first acquisition position and information of content to be acquired on the first acquisition position, and perform information acquisition according to the information of a first acquisition position and the information of content to be acquired on the first acquisition position.

In some exemplary embodiments, the acquisition unit is further configured to acquire first information acquisition indication information, wherein the first information acquisition indication information at least includes one of: the information of a first acquisition position of the first network element, the information of content to be acquired on the first acquisition position of the first network element, first acquisition mode indication information, a service identifier of the first network element, a service identifier of a third network element, a multi-network element shared service identifier, and information acquisition indication information corresponding to the third network element.

In some exemplary embodiments, the acquisition unit is further configured to perform information acquisition according to the information of a first acquisition position, the information of content to be acquired on the first acquisition position, and the first acquisition mode indication information.

In some exemplary embodiments, the acquisition unit is further configured to receive acquisition information reported by a second network element, and acquire and process the acquisition information reported by the second network element.

In some exemplary embodiments, the apparatus further includes a service unit, the service unit being configured to determine a service identifier of the first network element, the service identifier indicating a perception service that is able to be provided by the first network element.

In some exemplary embodiments, the service unit is further configured to determine a second network element and send second information acquisition indication information to the second network element.

According to still some other embodiments of the present disclosure, an electronic apparatus is further provided, and the electronic apparatus includes a memory and a processor: wherein the memory stores a computer program, and the processor is configured to run the computer program to execute the steps in any one of the method embodiments.

According to embodiments of the present disclosure, a first network element acquires information of a first acquisition position and information of content to be acquired on the first acquisition position, and performs information acquisition according to the described information, and thus the problems in the related art that information that is able to be perceived by a communication system is limited, the implementation manner in an information transfer process is relatively complex and it is difficult to ensure the quality of service, is able to be solved, thereby achieving the following effects: the range of information that is able to be perceived by a communication system is increased, the capability of the communication system perceiving information is enhanced, the implementation manner in an information transfer process is simple, the guarantee degree of quality of service is high, and it is applicable to various network architectures.

DETAILED DESCRIPTION OF THE EMBODIMENTS

Hereinafter, embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or precedence order.

Figure 1:
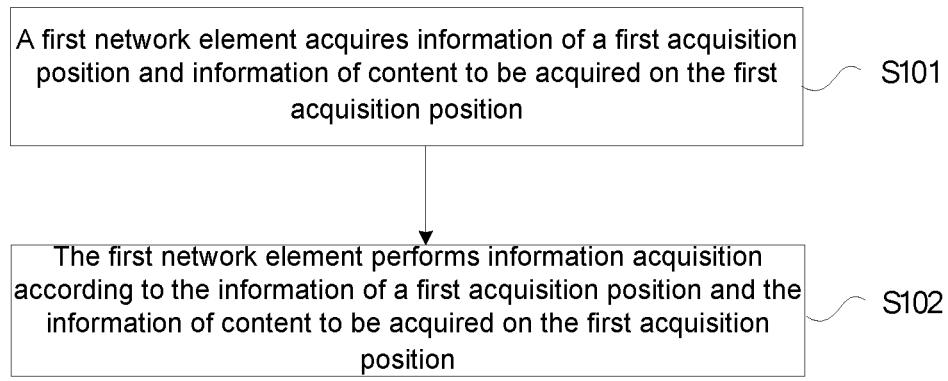
FIG. 1 is a flowchart of an information transfer method according to embodiments of the present disclosure.

An information transfer method is provided in this embodiment. FIG. 1 is a flowchart of an information transfer method according to embodiments of the present disclosure. As shown in FIG. 1, the flow includes the following steps:

step S101, a first network element acquires information of a first acquisition position and information of content to be acquired on the first acquisition position; and step S102: the first network element performs information acquisition according to the information of a first acquisition position and the information of content to be acquired on the first acquisition position.

In step S101 of this embodiment, the method is able to further include: the first network element acquires first information acquisition indication information, wherein the first information acquisition indication information at least includes one of: the information of a first acquisition position of the first network element, the information of content to be acquired on the first acquisition position of the first network element, first acquisition mode indication information, a service identifier of the first network element, a service identifier of a third network element, a multi-network element shared service identifier, information acquisition indication information corresponding to the third network element, and an acquisition request from the third network element.

In step S102 of this embodiment, the first network element performs information acquisition according to the information of a first acquisition position, the information of content to be acquired on the first acquisition position, and the first acquisition mode indication information in the first information acquisition indication information.

In this embodiment, the method is able to further include: the first network element determines a second network element and sends second information acquisition indication information to the second network element.

In this embodiment, the method is able to further include: the first network element acquires the first information acquisition indication information from the third network element.

In this embodiment, the method is able to further include: the first network element generates the first information acquisition indication information.

In this embodiment, the first network element determines second information acquisition indication information sent to the second network element according to one of: the first information acquisition indication information, the information of a first acquisition position of the first network element, the information of content to be acquired on the first acquisition position, information of a second acquisition position of the second network element, information of content to be acquired on the second acquisition position, request information of an internal logic unit of the first network element, the service identifier of the first network element, the service identifier of the third network element, the multi-network element shared service identifier, and an information acquisition mapping table acquired by the first network element.

Further, in this embodiment, the second information acquisition indication information at least includes one of: the information of a second acquisition position of the second network element, the information of content to be acquired on the second acquisition position of the second network element, second acquisition mode indication information, the service identifier of the first network element, the service identifier of the third network element, the multi-network element shared service identifier, and an acquisition request from the first network element.

Further, in this embodiment, after the first network element sends the second information acquisition indication information to the second network element, the method further includes: the first network element receives an acquisition response reported by the second network element, wherein the acquisition response includes one of: acquisition content information, an acquisition success message of the second network element, an acquisition failure message of the second network element, and an acquisition delay message of the second network element which are acquired by the second network element performing information acquisition according to the second information acquisition indication information.

Further, in this embodiment, after the first network element acquires the acquisition content information reported by the second network element, the method further includes: the first network element performs information acquisition processing according to the acquisition content information reported by the second network element and the first information acquisition indication information acquired by the first network element.

Further, in this embodiment, the information of a second acquisition position and the information of content to be acquired on the second acquisition position are jointly transmitted in an ID identifier manner or respectively transmitted to the second network element.

In some exemplary embodiments, the first acquisition mode indication information and/or the second acquisition mode indication information at least include one of the following parameters: acquisition precision, acquisition content priority, acquisition content reliability, acquisition delay requirement, QoS of acquisition content, life cycle of acquisition content, and service intention.

Further, in this embodiment, the first acquisition mode indication information and/or the second acquisition mode indication information at least include one of the following parameters: an acquisition position, an acquisition object, an acquisition type, an acquisition cycle, an acquisition mode and an acquisition content transmission mode.

Further, in this embodiment, the acquisition mode may at least include one of: centralized acquisition, decentralized acquisition, pass-through acquisition, direct acquisition and indirect acquisition.

Further, in this embodiment, the first acquisition mode indication information and/or the second acquisition mode indication information further include information processing parameters, and the information processing parameters at least include one of: a data processing mode, a data encryption mode, a data compression mode, and a data statistics mode.

Further, in this embodiment, the data processing mode at least includes one of: data averaging, data weighting, data filtering, and data removing.

In this embodiment, the data encryption mode may at least include one of: data encryption, data non-encryption, and adopted key.

In this embodiment, the data compression mode may at least include one of: data compression, data non-compression, and compression mode.

Further, in this embodiment, the first network element determines the service identifier used thereby according to at least one of: the information of a first acquisition position acquired by the first network element, the information of content to be acquired on the first acquisition position, first acquisition mode indication information acquired by the first network element, and a service identifier acquired from a third network element.

Further, in this embodiment, the first network element acquires the first acquisition mode indication information according to at least one of: the information of a first acquisition position acquired by the first network element, the information of content to be acquired on the first acquisition position, the service identifier acquired from the third network element, and the first information acquisition indication information.

Further, in this embodiment, the service identifier indicates a perception service that is able to be provided, including at least one of: service capability, service requirement, service object, service condition, service policy, report content, and service intent.

Further, in this embodiment, the first network element or the second network element or the third network element includes at least one of: a general logic unit, a general entity; a general node, a dedicated logic unit, a dedicated entity, and a dedicated node.

In this embodiment, the first network element may determine the second network element according to one of: the information of a first acquisition position of the first network element, the information of content to be acquired on the first acquisition position, information of a second acquisition position of the second network element, information of content to be acquired on the second acquisition position, request information of an internal logic unit of the first network element, a service identifier of the first network element, a service identifier received by the first network element from a third network element, a multi-network element shared service identifier, first information acquisition indication information, the second information acquisition indication information received from the third network element, and an information acquisition mapping table acquired by the first network element.

Further, in this embodiment, the second network element determines the second acquisition mode indication information of the second network element according to at least one piece of the following information: the information of a second acquisition position of the second network element, the information of content to be acquired on the second acquisition position, the service identifier of the first network element acquired by the second network element, the service identifier of the second network element, the multi-network element shared service identifier acquired by the second network element, the second information acquisition indication information acquired by the second network element, and the information acquisition mapping table acquired by the second network element.

In this embodiment, the information of a first acquisition position acquired by the first network element at least includes one of: position information of the first network element, position information of the second network element, and position information of the content to be acquired by the first network element.

In this embodiment, the information of content to be acquired on the first acquisition position or the information of content to be acquired on the second acquisition position includes at least one of: signal quality; context, system configuration, network state, network performance, environment information, resource occupation situation, resource mapping situation, application information, and semantic information.

Further, in this embodiment, the first network element may acquire one of the following according to an information acquisition mapping table of the first network element: the information of a first acquisition position of the first network element, the information of content to be acquired on the first acquisition position, first acquisition indication information of the first network element, an identifier of the second network element, information of a second acquisition position of the second network element, information of content to be acquired on the second acquisition position, and second acquisition indication information of the second network element.

Further, in this embodiment, an information acquisition mapping table acquired by the first network element may include one of: a static information acquisition mapping table which is stored by the first network element and contains a mapping relationship of acquisition information of multiple network elements, and a dynamic information acquisition mapping table which is calculated by the first network element and contains a mapping relationship of acquisition information of multiple network elements.

Further, in this embodiment, the information of a first acquisition position or the information of a second acquisition position at least includes one of: a combined identifier of multiple object IDs, a node identifier, a user identifier, a network identifier, a combination of the cell identifier and the user identifier, a beam identifier, a protocol layer identifier, a domain name identifier and a resource identifier.

In this embodiment, the information of a first acquisition position and/or the information of a second acquisition position at least includes one of: a geographic position of the content information to be acquired, a logical position of the content information to be acquired, a time domain position of the content information to be acquired, a frequency domain position of the content information to be acquired, a space domain position of the content information to be acquired, a code domain position of the content information to be acquired, and a network identifier of the content information to be acquired.

By means of the steps, a first network element acquires information of a first acquisition position and information of content to be acquired on the first acquisition position, and performs information acquisition according to the described information, the problems in the related art that information that is able to be perceived by a communication system is limited, the implementation manner in an information transfer process is relatively complex and it is difficult to ensure the quality of service, is able to be solved, thereby achieving the following effects: the range of information that is able to be perceived by a communication system is increased, the capability of the communication system perceiving information is enhanced, the implementation manner in an information transfer process is simple, the guarantee degree of quality of service is high, and it is applicable to various network architectures.

From the described description of the embodiments, a person skilled in the art would have been able to clearly understand that the methods in the described embodiments may be implemented by using software and necessary common hardware platforms, and of course may also be implemented by using hardware, but in many cases, the former is a better embodiment. On the basis of such understanding, the portion of the technical solution of the present disclosure that contributes in essence or to the related art may be embodied in the form of a software product, the software product being stored in a storage medium (such as an ROM/RAM, a magnetic disk and an optical disc); and the storage medium includes several instructions to cause a terminal device (which may be a mobile phone, a computer, a server or a network device, etc.) to execute the method according to various embodiments of the present disclosure.

An information transfer apparatus is also provided in this embodiment. The apparatus is used for implementing the described embodiments and optional embodiments, and what has been described will not be repeated. As used below; the term "module" may implement a combination of a software and/or hardware of predetermined functions. Although the apparatus described in the following embodiments is preferably implemented in software, implementation in hardware or a combination of software and hardware is also possible and could be conceived.

Figure 2:
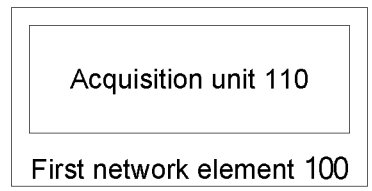
FIG. 2 is a structural block diagram of an information transfer apparatus according to embodiments of the present disclosure.

FIG. 2 is a structural block diagram of an information transfer apparatus according to embodiments of the present disclosure. As shown in FIG. 2, the apparatus is located in a first network element 100, and includes an acquisition unit 110.

The acquisition unit 110 is configured to acquire information of a first acquisition position and information of content to be acquired on the first acquisition position, and perform information acquisition according to the information of a first acquisition position and the information of content to be acquired on the first acquisition position.

In this embodiment, the acquisition unit 110 may be further configured to acquire first information acquisition indication information: the first information acquisition indication information at least includes one of: the information of a first acquisition position of the first network element, the information of content to be acquired on the first acquisition position of the first network element, first acquisition mode indication information, a service identifier of the first network element, a service identifier of a third network element, information acquisition indication information corresponding to the third network element, and multi-network element shared service identifier.

In this embodiment, the acquisition unit 110 may be further configured to perform information acquisition according to the information of a first acquisition position, the information of content to be acquired on the first acquisition position, and the first acquisition mode indication information.

In this embodiment, the acquisition unit 110 may be further configured to receive acquisition information reported by a second network element, and acquire and process the acquisition information reported by the second network element.

Figure 3:
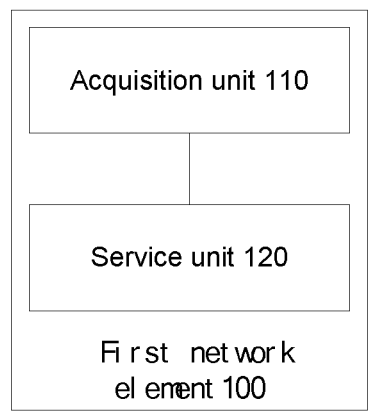
FIG. 3 is a structural block diagram of an information transfer apparatus having a service unit according to embodiments of the present disclosure.

FIG. 3 is a structural block diagram of an information transfer apparatus having a service unit according to embodiments of the present disclosure. As shown in FIG. 3, besides the acquisition unit 110 as shown in FIG. 2, the apparatus further includes a service unit 120.

The service unit 120 is configured to determine a service identifier of the first network element, the service identifier indicating a perception service that is able to be provided by the first network element.

In this embodiment, the service unit 120 is further configured to determine the second network element and send second information acquisition indication information to the second network element.

It should be noted that the described modules may be implemented by software or hardware. The latter may be implemented in the following manner, but is not limited thereto: all the modules are located in the same processor: or all the modules are located in different processors in any arbitrary combination manner.

Embodiments of the present disclosure further provide a computer-readable storage medium, the computer-readable storage medium storing a computer program, wherein the computer program is configured to execute, when running, the steps in any one of the method embodiments.

In some exemplary embodiments, the computer-readable storage medium may include, but is not limited to: various media that is able to store a computer program, such as a USB flash disk, a Read-Only Memory (ROM for short), a Random Access Memory (RAM for short), a mobile hard disk, a magnetic disk, or an optical disc.

Embodiments of the present disclosure further provide an electronic apparatus, including a memory and a processor, wherein the memory stores a computer program, and the processor is configured to run the computer program, so as to execute the steps in any one of the method embodiments.

In some exemplary embodiments, Optionally, the electronic apparatus is able to further include a transmission device and an input/output device, wherein the transmission device is connected to the processor, and the input/output device is connected to the processor.

For specific examples in the present embodiment, reference is able to be made to the examples described in the described embodiments and exemplary embodiments, and thus they will not be repeated again in the present embodiment.

To facilitate understanding of the technical solutions provided in the present disclosure, hereinafter, illustration is made in detail in combination with embodiments of specific scenarios.

In the previous communication systems, the acquisition of perception information is transferred according to the sequence of protocol layers, information that is able to be perceived is limited, the implementation manner in an information transfer process is relatively complex, and it is difficult to ensure the quality of service.

In order to meet communication requirements, information of a communication system needs to be perceived, and perception of information needs to determine which information is to be acquired and how to perform acquisition according to requirements. In optional embodiments of the present disclosure, the acquisition of information is achieved in a manner of decomposing perception service requirements layer by layer.

Figure 4:
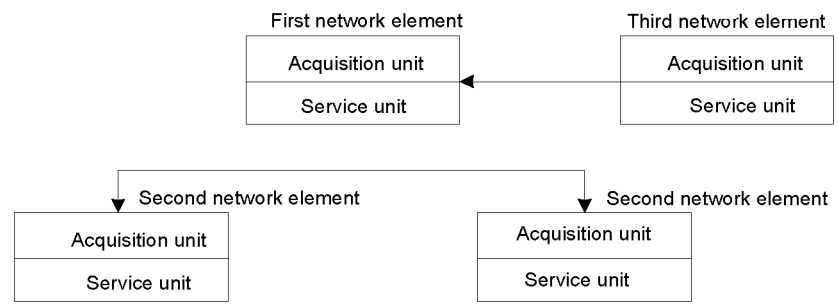
FIG. 4 is a structural block diagram of an information transfer mapping relationship according to optional embodiments of the present disclosure.

FIG. 4 is a structural block diagram of an information transfer mapping relationship according to optional embodiments of the present disclosure. As shown in FIG. 4, each level of acquisition source includes an acquisition unit and a service unit, in which the acquisition unit is configured to acquire an information acquisition position, specific acquisition content and acquisition information indication mode of the current-level acquisition source: the acquisition position and the acquisition content is able to be indicated by using one ID or indicated respectively, the acquisition information indication mode is able to be identified by AQI (Acquisition quality indication), and the acquisition information indication mode is used for performing perception information quality control of a perceived information flow on a transport layer and a processing layer. The service unit is configured to send, to a lower-level acquisition source, information such as an information acquisition position, specific acquisition content and/or acquisition information indication mode of the lower-level acquisition source, etc. The service unit also determines a service ID of the current level, in which the service ID indicates service capability, service requirement, object, policy, report content, service intention, etc. which is able to be provided by the current-level acquisition source. The service unit determines the service ID of the current level according to at least one of the information acquisition position, specific acquisition content, acquisition information indication mode, and an upper-level service ID which are obtained by the current-level acquisition source. A first network element performs information acquisition according to acquired acquisition indication information; and the first network element determines a second network element according to a service ID of the first network element, and sends acquisition indication information to the second network element, to guide the second network element to perform information acquisition. The acquisition information acquired by the first network element includes but is not limited to: acquisition position information, content information acquired on the acquisition position, acquisition mode indication information, and a service identifier. These acquisition information may be acquisition information of the first network element itself or acquisition information of other network elements, and may also be acquisition information forwarded by a third network element to the second network element through the first network element.

Taking FIG. 4 as an example, the first network element serves as a first level of information acquisition and is a first acquisition source, the second network element serves as a second level and is a second acquisition source, and the third network element may serve as an upper-level information acquisition source of the first network element and may also be a same-level or no-level acquisition source for information forwarding. The first network element determines the position and acquisition content of the second network element, and the second network element (a lower-level acquisition source) determines service requirement of the current level according to service requirement of the first network element (an upper-level acquisition source). With regard to each level of network element, when the current-level acquisition source does not receive an acquisition information indication mode, the current-level acquisition source may also generate an acquisition information indication mode of the current level by means of received information acquisition position, acquisition content and upper-level service identifier.

The acquisition information indication mode includes but is not limited to: acquisition type, acquisition precision, acquisition cycle, acquisition content priority, acquisition content reliability, acquisition delay requirement, life cycle of acquisition content. Quality of Service (QoS) of acquisition content, acquisition content transmission mode, centralized acquisition, decentralized acquisition, acquisition network element, direct acquisition, indirect acquisition, pass-through acquisition. For example, the acquisition type may be measurement type, service type, signaling type, etc.; different acquisition content priorities determine information acquisition sequences: the acquisition content reliability and delay requirement ensure the reliability and timeliness of a service, and indicate whether to process preferentially during acquisition and transmission or discard during congestion; and the life cycle of acquisition content determines control of generation, maintenance and disappear of acquisition information; and pass-through acquisition indicates that the current-level network element mainly functions to forward acquisition information indication. A person skilled in the art shall be aware that in practical applications, the optional embodiments of the present disclosure are not limited to the described examples.

For each network element, each level of acquisition source corresponding thereto may be a combination of multiple object IDs/a certain node ID/an internal identifier of user of a certain protocol layer/a network identifier/a cell identifier+a user identifier, etc., and may also be a node position of acquisition data, such as a base station ID, a UE ID, a beam ID, etc., may also refer to various protocol layers, such as a Physical layer (PHY), a Medium Access Control (MAC) layer, a Radio Resource Control (RRC) layer, etc., and may even refer to different domains.

Figure 5:
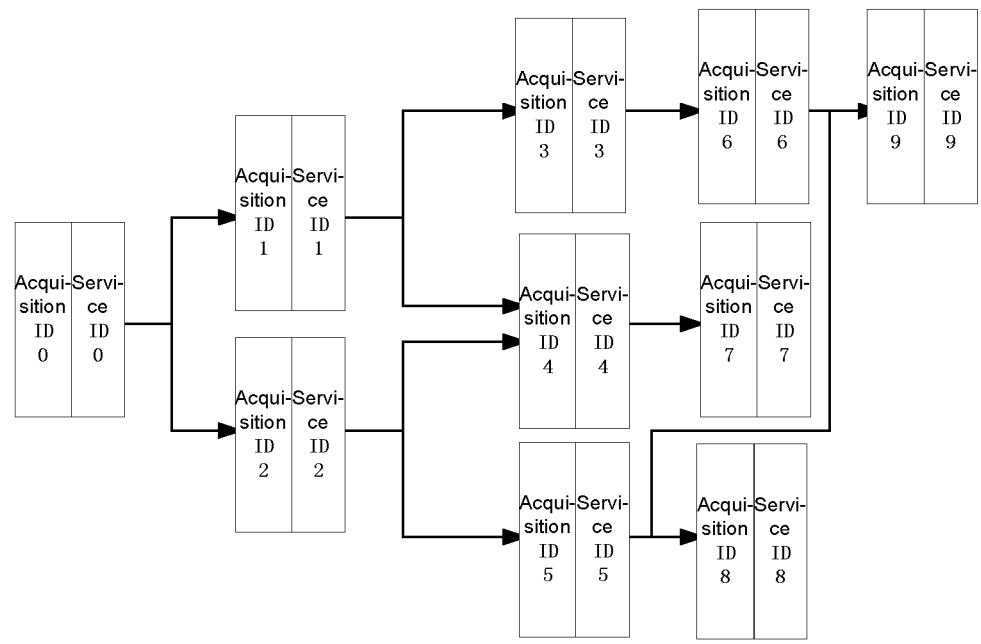
FIG. 5 is a structural block diagram of a multi-level mapping relationship of a perception model according to optional embodiments of the present disclosure.

FIG. 5 is a structural block diagram of a multi-level mapping relationship of a perception model according to optional embodiments of the present disclosure. As shown in FIG. 5, one perception service ID is able to be mapped to multiple lower-level acquisition source IDs, and each information acquisition point itself has one acquisition source ID (associated with an upper-level perception service ID) and one perception service ID (used to associate with a lower-level acquisition source ID), and is mapped by using a tree-link structure+onion peeling manner. The tree-link list structure refers to association mapping from upper-level information perception to lower-level information perception, for example, mapping from an upper-level acquisition source to a lower-level acquisition source. The onion peeling manner in this embodiment refers to layer-by-layer decomposition of perception requirement, that is, there is a top-level requirement, the top-level requirement is divided into various levels to become requirements of the various levels, and when division is performed until the top-level requirement is satisfied, the division ends.

It is able to be determined from FIG. 5 that different service IDs may be mapped to the same acquisition ID, for example, lower levels of both service ID1 and service ID2 have acquisition ID4; in addition, one service ID may be associated with multiple acquisition sources that appear to be different levels to another service ID, wherein acquisition ID8 and acquisition ID9 appear to be different levels in the whole mapping architecture, but may both be mapped by service ID6.

The association from the service unit of each level to the acquisition source of a lower level may be represented by mapping from service ID to acquisition source ID. Table 1 is a mapping linked list of a multi-level perception model. As shown in Table 1, each acquisition source ID has its own perception service ID; and each level of acquisition source generates a current-level service ID according to information obtained by the current level by means of manners such as AI inference or table look-up, and the service ID determines a lower-level acquisition source by means of manners such as AI inference or table look-up.

TABLE 1

| Acquisition $ID_0$ | | AQI of acquisition $ID_0$ | |
|---|---|---|---|
| Perception service $ID_0$ | | | |
| Acquisition $ID_1$ | AQI of acquisition $ID_1$ | Acquisition $ID_2$ | AQI of acquisition $ID_2$ |
| Perception service $ID_1$ | | Perception service $ID_2$ | |

Mapping from a service ID to a lower-level acquisition source includes two modes: static mapping and dynamic mapping. The static mapping means that a network has set a fixed mapping relationship, and each level of acquisition source ID and service ID correspond to lower-level fixed acquisition information, such as lower-level acquisition source ID, lower-level service ID, lower-level acquisition position, and lower-level acquisition content. Dynamic mapping refers to a mapping relationship that is automatically adjusted according to a running condition of a network system. By means of manners such as big data analysis, artificial intelligence, automatic learning and memory network running condition, etc., optimal lower-level acquisition source and AQI and service ID are automatically calculated as required. In addition, the association mapping may be made into a manner of a subnet local mapping table, and a part of mapping information is stored in each node. The static mapping manner has good controllability, is easy to be configured, and requires less consumption resources, but has disadvantages that it takes time to perform configuration and maintenance, the reaction to network change is slow; and configuration personnel needs to fully grasp the network condition. The dynamic mapping manner is able to adapt to dynamic changes of a network and reduce errors, but need to occupy certain resources for intelligent computation, and need to manage much information. However, it should be considered that a combination of dynamic mapping and AI may achieve a better effect.

It should be noted that in the following embodiments, acquisition ID is used to identify an acquisition position and acquisition content, and AQI is used to represent an acquisition indication mode.

Figure 6:
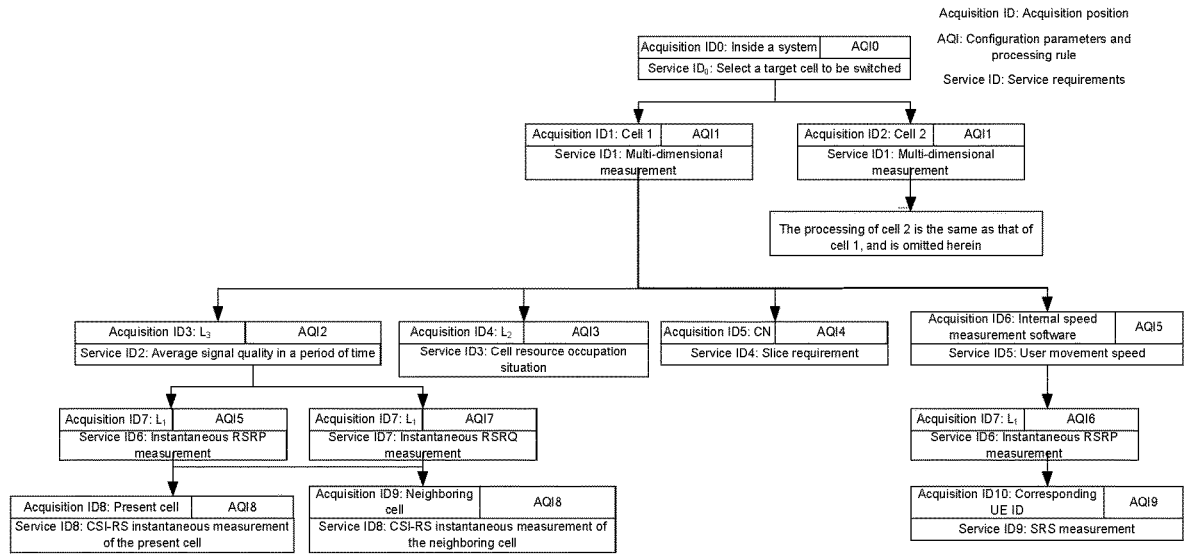
FIG. 6 is a schematic structural diagram of multi-dimensionally determining a target cell to be switched according to optional embodiments of the present disclosure.

Optional Embodiment I: Multi-Dimensionally Determine a Target Cell to be Switched When a user moves to an edge of a cell, it is necessary to switch from a serving cell to a target cell. Generally, the signal quality of multiple neighboring cells is measured, and a switching restricted condition (threshold) is set. When there is a neighboring cell having a switching threshold exceeding that of the target cell, switching is triggered. This method of making a determination by a threshold is able to hardly consider multiple factors such as load condition and service characteristics of various cells at the same time, and even if other factors are taken into consideration, the determination is able to only be achieved by performing some complicated operations on the factors and converting same into modification of a switching threshold, which greatly reduces the accuracy and timeliness of switching. FIG. 6 is a schematic structural diagram of multi-dimensionally determining a target cell to be switched according to optional embodiments of the present disclosure. As shown in FIG. 6, the present optional embodiment is able to achieve automatic switching affected by multiple factors.

First Level:

A perception service of an acquisition source ID0 corresponds to a service ID0, and the service ID0 indicates that UE moves to an edge of a cell and needs to select a target cell to be switched. Acquisition sources ID1 (cell 1) and ID2 (cell 2) are configured, and are configured with the same AQI1 (the AQI1 contains indication of parameters requiring multi-dimensional evaluation). The acquisition source ID1 determines a service ID1 thereof (representing requirement of combining acquisition cell indexes) according to the service ID0 and AQI1.

Second Level:

The service ID1 determines four acquisition sources ID3/ID4/ID5/ID6 to meet requirements thereof. Herein, the processing of two cells is the same, cell 1 is just taken as an example.

The channel quality after the acquisition source ID3 obtains layer-3 filtering corresponds to AQI2, and is converted into a service ID2.

The acquisition source ID4 obtains resource occupation situation, such as MAC scheduling information, etc. of a target cell, in which the resource occupation situation corresponds to AQI3 and is converted to a service ID3.

The acquisition source ID5 obtains slice information, such as service type, time delay information and service priority, etc. in a core network, and the slice information corresponds to AQI4 and is converted into a service ID4.

The acquisition source ID6 obtains a movement speed of the UE by using internal speed measurement software (APP manner), and determines a user group scenario by means of the movement speed, in which the movement speed corresponds to AQI5 and is converted into a service ID5.

Third Level:

The service ID2 determines two acquisition sources, here, the two acquisition sources both use acquisition ID7, which is intended to indicate that measurement is performed at the same acquisition position, and different AQIs is able to indicate the requirements of measurement of Reference Signal Received Power (RSRP) and Reference Signal Received Quality (RSRQ), which are respectively converted into a service ID6 and a service ID7.

The service ID5 determines an acquisition source ID7, which is also a physical layer instantaneous RSRP measurement and is converted into the service ID6.

The service ID3 and the service ID4 may also be further decomposed into acquisition sources and service IDs of a lower level, which will not be illustrated herein.

Fourth Level:

the service ID6 determines that the present cell uses a Channel State Information Reference Signal (CSI-RS) to perform RSRP measurement, and the service ID7 determines that the present cell and a neighboring cell use CSI-RS to perform RSRQ measurement: as both of the services use CSI-RS to perform measurement, the same AQI8 is able to be used.

In combination with upper-level information (context information), the service ID6 is able to also be determined as uplink SRS measurement of certain UE. That is to say, the service ID of each layer is not necessarily mapped to a fixed service ID at a lower level, but it is possible to perform inference mapping with reference to information of one upper layer or even multiple layers.

It should be noted that Embodiment I relates to detailed decomposition, while the schematic diagrams of other embodiments are not decomposed to the bottom level. It should be noted that when a system is running, if the requirement for decomposing to a certain level is satisfied, it is not necessary to continue to decompose to a lower level. If the signal quality in a period of time is able to be acquired at L3, it is not necessary to decompose to L1 to acquire instantaneous signal quality.

Optional Embodiment II: Beam Combination Across Different Physical Cell Identities (PCI)

Figure 7:
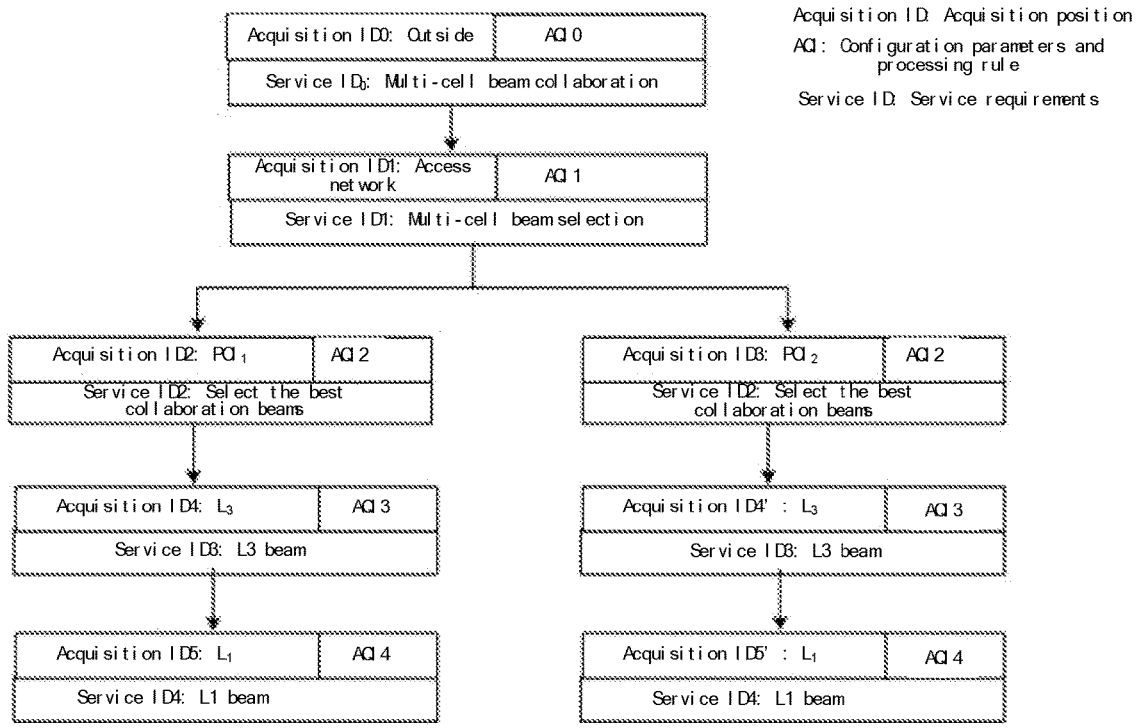
FIG. 7 is a schematic perception diagram of providing service to UE by using multi-PCI combined beams according to optional embodiments of the present disclosure.

FIG. 7 is a schematic perception diagram of providing service to UE by using multi-PCI combined beams according to optional embodiments of the present disclosure. As shown in FIG. 7, for a cell edge user or a high-level user, if multiple cell-specific beams with strong signals are used to provide a service for the user, beam interference is greatly reduced, thereby improving the quality of service for the user.

Here, an acquisition source ID0 is located outside a wireless communication system, the external requirement thereof corresponds to a service ID0, the service ID0 is mapped to an acquisition source ID1 of an access network, the acquisition ID1 corresponds to a service ID1 of which the corresponding service is to select multiple PCI beams: the service ID1 converts service requirement to perform information acquisition on acquisition sources ID2 and ID3, and the acquisition sources ID2 and ID3 obtain a service ID2 according to information of the service ID1 and the acquisition source ID1, the service ID2 representing selecting the best beams; and an acquisition ID4 and a service ID3 are obtained according to the acquisition ID2 and the service ID2, and L3 filtering information acquisition is performed, and so on, further decomposition is performed to obtain an acquisition ID5 and a service ID4, and acquisition perception of L1 filtering information is performed. For downward decomposition of the acquisition ID3, reference is able to be made to the acquisition ID2. By means of information of acquisition position, acquisition content, acquisition purpose and acquisition requirement, a lower-level acquisition source and position, content and acquisition requirement of the acquisition source is able to be determined.

Figure 8:
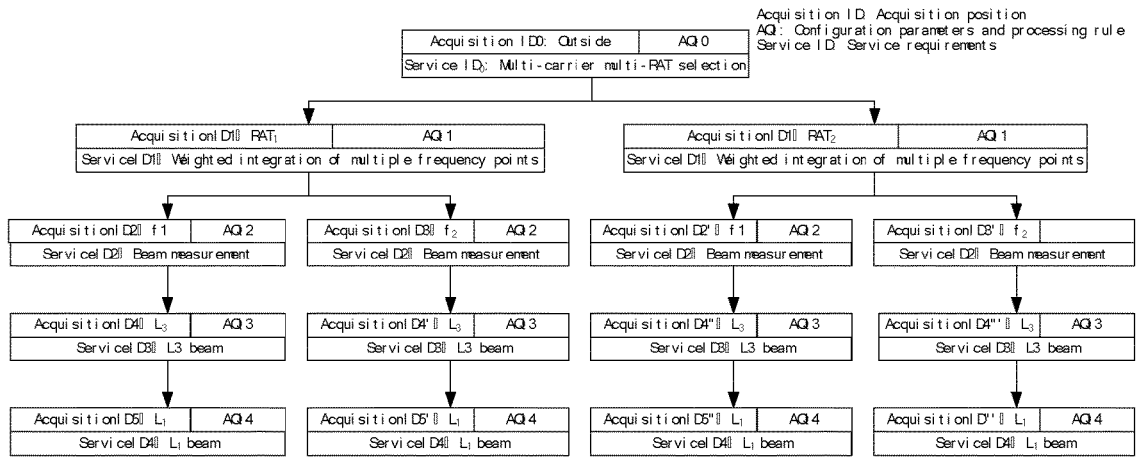
FIG. 8 is a schematic perception diagram of multi-band RAT selection according to optional embodiments of the present disclosure.

Optional Embodiment III: Selection of a Radio Access Technology (RAT) after Weighting and Integration Evaluation of Different Frequency Points FIG. 8 is a schematic perception diagram of multi-band RAT selection according to optional embodiments of the present disclosure. As shown in FIG. 8, the selection of an RAT in a scenario where multiple RATs have multiple frequency points at the same time is provided, and perception of multi-level decomposition is realized by means of a decomposition method of frequency point weighting to single frequency point measurement. This perception model is also well adaptive to multi-RAT access of different modes and systems.

Optional Embodiment IV: Perception Optimization of Specific APP

Figure 9:
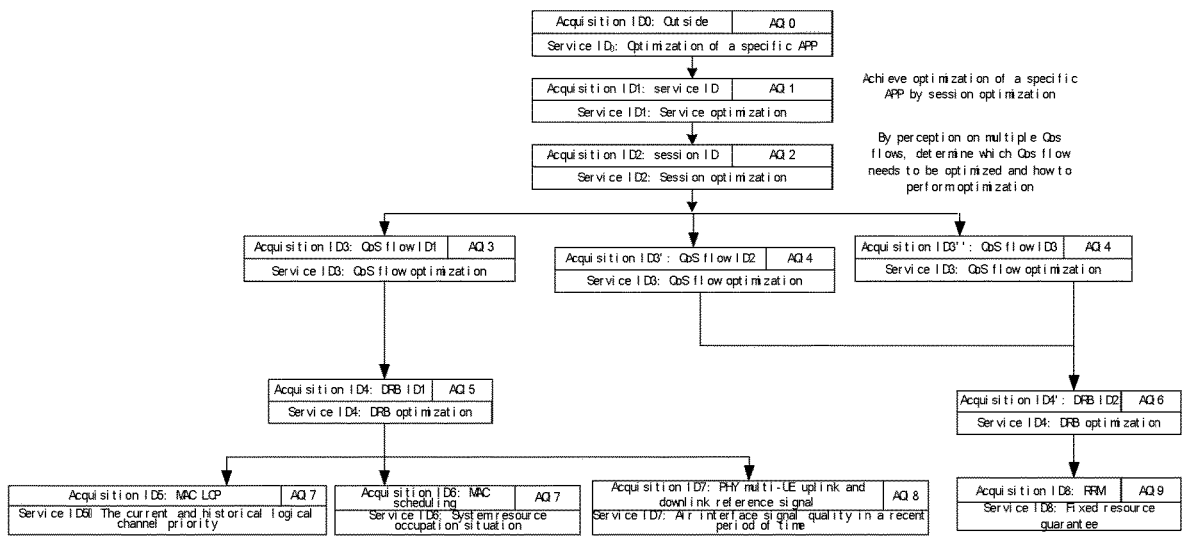
FIG. 9 is a schematic structural diagram of specific APP perception optimization according to optional embodiments of the present disclosure.

FIG. 9 is a schematic structural diagram of specific APP perception optimization according to optional embodiments of the present disclosure. As shown in FIG. 9, for a specific APP, multiple services are included, and it is necessary to perform precise optimization on different services. Taking WeChat as an example, this APP needs to support functions such as video, voice, and short message. Through layer-by-layer perception, a service requires to be decomposed into a session, then to a QoS flow; and finally to a bearer. As shown in the figure, a video service is mapped from a QoS Flow1 to a data radio bearer (DRB1), and by perception of a system resource occupation condition and a radio signal quality of a UE group, and in conjunction with priority assignment of logical channels, optimization of the video service is able to be realized, such as switching between standard definition/ high definition, the resource occupation size in an idle time period and the improvement of an assigned priority: A voice service QoS flow2 and a short message service QoS flow3 are both mapped to a DRB2, and as the data flow is small and of high importance, it may be necessary to improve the priority and to use fixed resources for guarantee.

Optional Embodiment V: Specific User/User Group Perception Optimization

Figure 10:
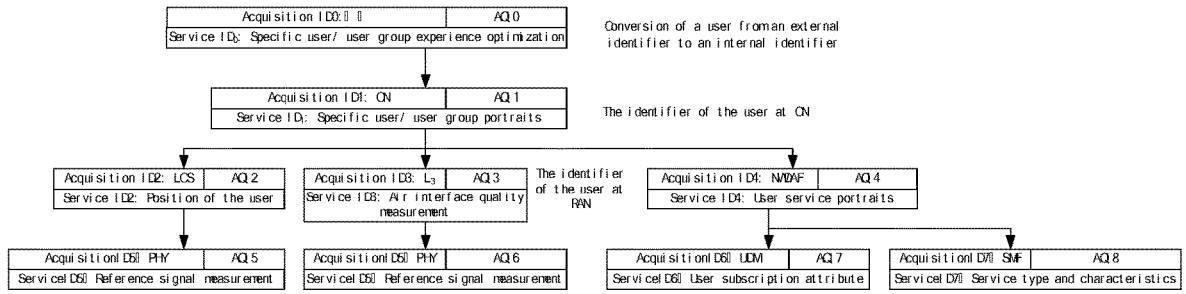
FIG. 10 is a schematic structural diagram of specific user/user group optimization according to optional embodiments of the present disclosure.

FIG. 10 is a schematic structural diagram of specific user/user group optimization according to optional embodiments of the present disclosure. As shown in FIG. 10, for a specific user, such as a user who frequently made complaints, the coverage condition and air interface signal quality thereof is able to be determined in a perception manner, thereby accurately positioning the problem; and for a specific user group (a community and a business district), common interests of the user group is able to be extracted to deliver business contents. In this schematic diagram, the acquisition sources are identifiers of users, and there are respective user identifiers at different positions of an external application, a core network and an access network, and when a mapping is perceived, conversion of user identifiers needs to be performed.

Optional Embodiment VI: Perception Optimization of a Transmission Control Protocol (TCP)

Figure 11:
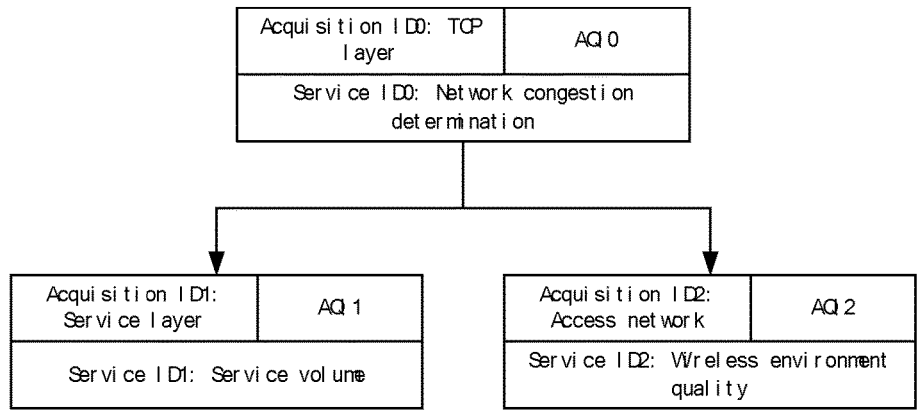
FIG. 11 is a schematic structural diagram of perception optimization of TCP congestion determination according to optional embodiments of the present disclosure.

FIG. 11 is a schematic structural diagram of perception optimization of TCP congestion determination according to optional embodiments of the present disclosure. As shown in FIG. 11, by perceiving the current service volume and wireless environment state, a TCP layer determines whether congestion is caused due to excessive data flow or data loss is caused due to bad wireless environment, and further adjusts a congestion window and a timeout period. This manner achieves cross-layer information acquisition and perception.

Optional Embodiment VII: Cross-Domain Perception

Figure 12:
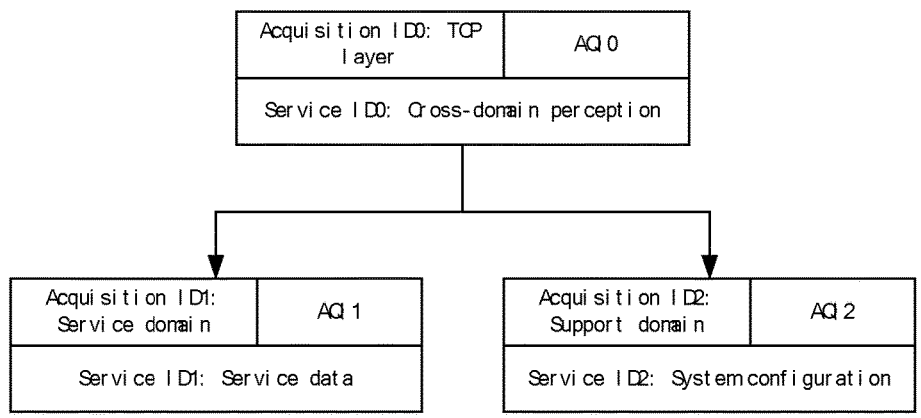
FIG. 12 is a schematic structural diagram of cross-domain perception according to optional embodiments of the present disclosure.

FIG. 12 is a schematic structural diagram of cross-domain perception according to optional embodiments of the present disclosure. As shown in FIG. 12, information of different domains may also be achieved in a manner of multi-domain decomposition.

Optional embodiments of the present disclosure provide an information transfer method and apparatus, in which perception requirements are decomposed, flexible cross-layer information perception is performed, the requirements is able to be directly associated with expected information acquisition points thereof, and in an information flow transfer process, an acquisition quality indication manner is used to ensure the quality of service of an information flow on a transport layer and a processing layer. The optional embodiments of the present disclosure are applicable to information perception of existing communication systems and future communication architectures, and is able to be applicable to information perception of service-based architectures or domain-based architectures and to an intention-based network.

The optional embodiments of the present disclosure is able to be widely applied to various scenarios of wireless and wired communications, and is able to also be applied to network architectures such as Internet of Things, the Internet, an intention-based network, a B5G network and a 6G network, and have broad commercial prospects.

It is apparent that a person skilled in the art shall understand that all of the described modules or steps in the present disclosure may be implemented by using a general computing apparatus, may be centralized on a single computing apparatus or may be distributed on a network composed of multiple computing apparatuses. The modules or steps may be implemented by using executable program codes of the computing apparatus, and thus, the program codes may be stored in a storage apparatus and executed by the computing apparatus, and in some cases, the shown or described steps may be executed in a sequence different from that shown herein, or the modules or steps are manufactured into integrated circuit modules, or multiple modules or steps therein are manufactured into a single integrated circuit module for implementation. Thus, the present disclosure is not limited to any specific hardware and software combinations.

The content above merely relates to optional embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

The invention claimed is:

1. An information transfer method, comprising:
    acquiring, by a first network element, first information acquisition indication information, the first information acquisition indication information comprises: first acquisition mode indication information, information of a first acquisition position and information of content to be acquired on the first acquisition position;
    performing, by the first network element, information acquisition according to the first acquisition mode indication information, information of the first acquisition position and the information of the content to be acquired on the first acquisition position;
    determining, by the first network element, a second network element and a second information acquisition indication information sent to the second network element according to at least one of the following: first acquisition mode indication information, information of a second acquisition position of the second network element and information of content to be acquired on the second acquisition position; and
    sending, by the first network element, the second information acquisition indication information to the second network element so as to indicate the second network element to perform information acquisition.

2. The method according to claim 1,
    wherein the first information acquisition indication information at least further comprises one of: a service identifier of the first network element, a service identifier of a third network element, a multi-network element shared service identifier, information acquisition indication information corresponding to the third network element, and an acquisition request from the third network element.

3. The method according to claim 2, wherein the method further comprises:
    acquiring, by the first network element, first information acquisition indication information from a third network element: or
    generating, by the first network element, the first information acquisition indication information.

4. The method according to claim 2, wherein the acquisition mode indication information at least comprise one of the following parameters: acquisition precision, acquisition content priority, acquisition content reliability, acquisition delay requirement, Quality of Service (QoS) of acquisition content, life cycle of the acquisition content, service intention, an acquisition position, an acquisition object, an acquisition type, an acquisition cycle, an acquisition mode, an acquisition content transmission mode, wherein the acquisition mode at least comprises one of: centralized acquisition, decentralized acquisition, pass-through acquisition, direct acquisition and indirect acquisition.

5. The method according to claim 2, wherein the acquisition mode indication information further comprise information processing parameters, and the information processing parameters at least comprise one of: a data processing mode, a data encryption mode, a data compression mode, and a data statistics mode, wherein the data processing mode at least comprises one of: data averaging, data weighting, data filtering, and data removing, wherein the data encryption mode at least comprises one of: data encryption, data non-encryption, and adopted key, wherein the data compression mode at least comprises one of: data compression, data non-compression, and compression mode.

6. The method according to claim 2, wherein the first network element acquires the first acquisition mode indication information according to at least one of: the information of the first acquisition position acquired by the first network element, the information of the content to be acquired on the first acquisition position, the service identifier acquired from the third network element, and the first information acquisition indication information.

7. The method according to claim 1,
    wherein the first network element determines the second network element according to one of: the information of the first acquisition position of the first network element, the information of the content to be acquired on the first acquisition position, information of a second acquisition position of the second network element, information of content to be acquired on the second acquisition position, request information of an internal logic unit of the first network element, a service identifier of the first network element, a service identifier received by the first network element from a third network element, a multi-network element shared service identifier, first information acquisition indication information, the second information acquisition indication information received from the third network element, and an information acquisition mapping table acquired by the first network element;
    and
    wherein the second information acquisition indication information at least comprises one of: information of a second acquisition position of the second network element, information of content to be acquired on the second acquisition position by the second network element, second acquisition mode indication information, a service identifier of the first network element, a service identifier of a third network element, a multi-network element shared service identifier, and an acquisition request from the first network element.

8. The method according to claim 7, wherein the first network element further determines second information acquisition indication information sent to a second network element according to at least one of: information of a second acquisition position of the second network element, information of content to be acquired on the second acquisition position, request information of an internal logic unit of the first network element, a service identifier of the first network element, a service identifier of a third network element, a multi-network element shared service identifier, and an information acquisition mapping table acquired by the first network element.

9. The method according to claim 8, wherein the information of the second acquisition position and the information of the content to be acquired on the second acquisition position are jointly transmitted in an identifier manner or are respectively transmitted to a second network element.

10. The method according to claim 8, wherein the first network element acquires one of the following according to the information acquisition mapping table of the first network element: the information of the first acquisition position of the first network element, the information of the content to be acquired on the first acquisition position, first acquisition indication information of the first network element, an service identifier of the second network element, information of a second acquisition position of a second network element, information of content to be acquired on the second acquisition position, and second acquisition indication information of the second network element.

11. The method according to claim 7, wherein after sending, by the first network element, the second information acquisition indication information to the second network element, the method further comprises:
receiving, by the first network element, an acquisition response reported by the second network element, wherein the acquisition response comprises one of: acquisition content information, an acquisition success message of the second network element, an acquisition failure message of the second network element, and an acquisition delay message of the second network element which are acquired by the second network element performing information acquisition according to the second information acquisition indication information.

12. The method according to claim 11, wherein after acquiring, by the first network element, the acquisition content information reported by the second network element, the method further comprises:
performing, by the first network element, information acquisition processing according to the acquisition content information reported by the second network element and the first information acquisition indication information acquired by the first network element.

13. The method according to claim 1, wherein the first network element determines a service identifier used by the first network element according to at least one of: the information of the first acquisition position acquired by the first network element, the information of the content to be acquired on the first acquisition position, first acquisition mode indication information acquired by the first network element, and a service identifier acquired from a third network element.

14. The method according to claim 1, wherein the second network element determines the second acquisition mode indication information of the second network element according to at least one piece of the following information: the information of the second acquisition position of the second network element, the information of the content to be acquired on the second acquisition position, the service identifier of the first network element acquired by the second network element, a service identifier of the second network element, a multi-network element shared service identifier acquired by the second network element, the second information acquisition indication information acquired by the second network element, and an information acquisition mapping table acquired by the second network element.

15. The method according to claim 1, wherein the information of the first acquisition position acquired by the first network element at least comprises one of: position information of the first network element, position information of a second network element, and position information of the content to be acquired by the first network element.

16. The method according to claim 1, wherein the information of the content to be acquired on the first acquisition position or content information to be acquired on a second acquisition position comprises at least one of: signal quality, context, system configuration, network state, network performance, environment information, resource occupation situation, resource mapping situation, application information, and semantic information.

17. The method according to claim 1, wherein the information of the first acquisition position or information of a second acquisition position at least comprises one of: a combined identifier of multiple object IDs, a node identifier, a user identifier, a network identifier, a combination of the cell identifier and the user identifier, a beam identifier, a protocol layer identifier, a domain name identifier and a resource identifier, or wherein the information of the first acquisition position and/or the information of the second acquisition position at least comprises one of: a geographic position of the content information to be acquired, a logical position of the content information to be acquired, a time domain position of the content information to be acquired, a frequency domain position of the content information to be acquired, a space domain position of the content information to be acquired, a code domain position of the content information to be acquired, and a network identifier of the content information to be acquired.

18. A non-transitory computer-readable storage medium, wherein the computer-readable storage medium stores a computer program, wherein the computer program is configured to execute, when running, the method according to claim 1.

19. An electronic apparatus, comprising a memory and a processor, wherein the memory stores a computer program, and the processor is configured to run the computer program so as to execute the method according to claim 1.

* * * * *